May 14, 1963 N. MIROW 3,089,491
CARTRIDGE SEAL AND NEEDLE HOLDER WITH AIR-LOCK DEVICE
Filed Aug. 24, 1961
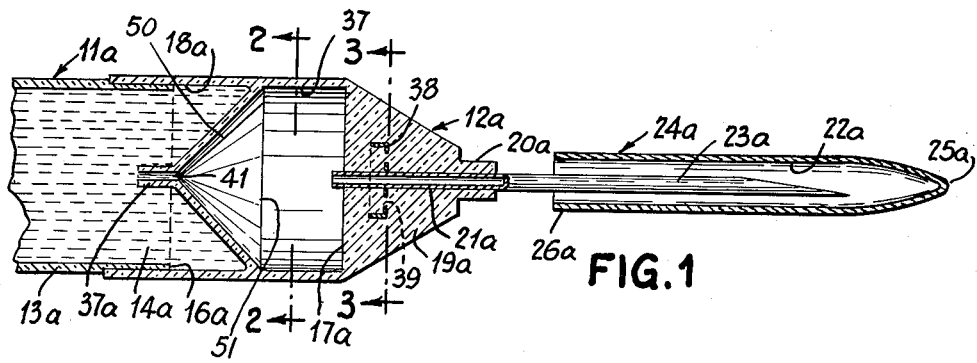
FIG.1
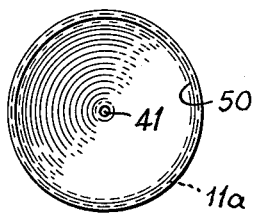
FIG.2
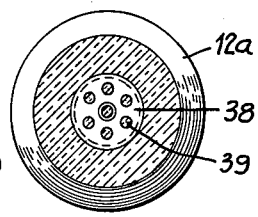
FIG.3
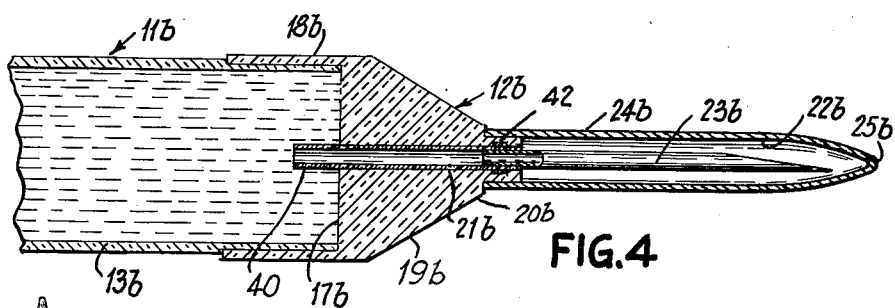
FIG.4
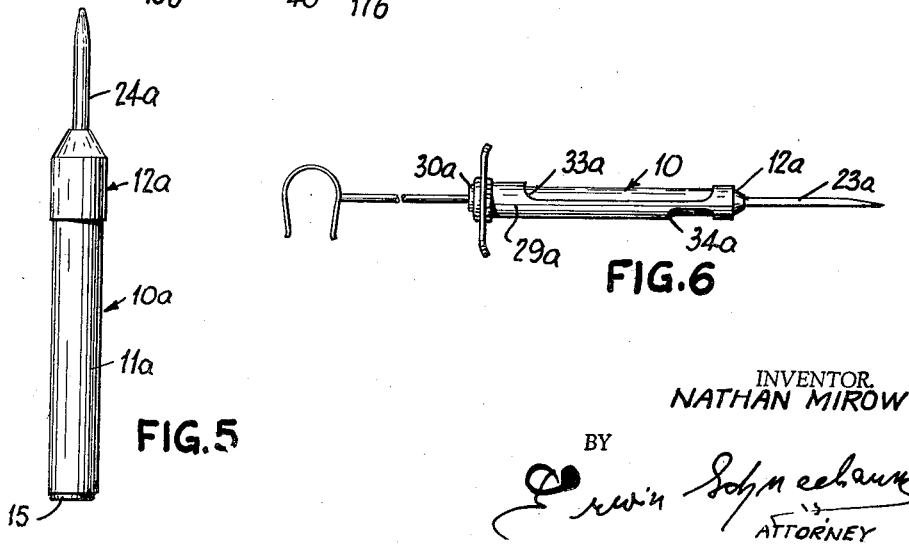
FIG.5
FIG.6
INVENTOR.
NATHAN MIROW
BY
Erwin John eelaun
ATTORNEY United States Patent Office 3,089,491
Patented May 14, 1963

3,089,491
CARTRIDGE SEAL AND NEEDLE HOLDER
WITH AIR-LOCK DEVICE
Nathan Mirow, 79 Brighton 11th St., Brooklyn, N.Y.
Filed Aug. 24, 1961, Ser. No. 133,633
1 Claim. (Cl. 128—218)

This invention relates broadly to appliances intended for use by dentists and physicians, and more particularly to a unitary device which serves simultaneously as a seal for a cartridge containing an injectable drug and a holder for a pre-sterilized, disposable, hollow metal injection needle, wherein the metal injection needle is isolated from the drug in the cartridge until the moment it is intended to be used.

The present application is a supplement to an application filed by the present applicant on June 21, 1961, under Serial No. 118,831 which is now pending before the Patent Office.

In the basic patent application, one end of a metal injection needle is shown and described as being entered into a drug containing cartridge and as being in constant contact with the drug in the cartridge.

Dental and medical authorities have expressed concern that continuous and prolonged contact between a metal injection needle and an injectable drug might cause the drug to deteriorate, thereby reducing the effectiveness of the drug and causing the patient to whom it is administered considerable discomfort and possibly serious harm.

With this in mind, it is the principal object of the present invention to provide a device of this character, wherein the metal injection needle is completely isolated from the injectable drug in the cartridge from the time of manufacture, transportation and storage until the moment the dentist is ready to use it.

A further aim of the present invention resides in the provision of a device of this character, wherein a chamber of trapped air is provided between the drug in the cartridge and the metal injection needle, the trapped air being prevented from escaping inadvertently, thereby separating the drug from the metal injection needle until the device is being used.

And a still further aim of the present invention resides in the provision of a unitary plastic seal and needle holder for a drug-containing cartridge, the seal portion of which engages the cartridge frictionally, the needle holder having a pre-sterilised metal injection needle therein, the metal injection needle being completely isolated from contact with the drug in the cartridge by trapped air in a funnel-shaped air chamber between the seal portion of the device and the metal injection needle.

And a still further purpose of the present invention resides in the provision of a plastic funnel molded in the interior of the plastic seal portion of the present device, the funnel terminating in a plastic cannula, which extends into the drug in the cartridge, the metal injection needle, insofar as it extends outwardly beyond the needle holder being provided with a plastic air-tight cover to keep the pre-sterilised metal injection needle sterile, and to prevent the unwarranted escape of trapped air outwardly, the inward escape of trapped air being prevented by positioning of the plastic cannula in the drug.

Yet another advantage of the present invention resides in the provision of a device of this character, which will not permit the inadvertent escape of trapped air even when the cartridge is tilted or turned.

Still another purpose of the present invention resides in the provision of a device of this character including a plastic cannula, one end of which is positioned in the drug inside the cartridge, the other end of the plastic cannula being joined with the inner end of a metal injection needle, the other end of the pre-sterilized metal injection needle being provided with an air-tight plastic cover, whereby air trapped in the plastic cannula is prevented from escaping through the metal needle by the cover and through the plastic cannula by its position in the drug supply.

And yet another purpose of the present invention resides in the provision of a device of this character, which comprises a unitary plastic seal and needle holder for a drug-containing cartridge, and an air-tight plastic cover for the part of the pre-sterilised metal injection needle which extends outwardly beyond the needle holder, and the invention further comprises a plastic cannula spaced from the metal injection needle, one end of the plastic cannula being entered in the drug inside the cartridge whereby air is trapped between the plastic cannula and the metal injection needle, thereby preventing the drug from coming in contact with the metal injection needle until the cover is removed from the metal injection needle and the trapped air is forcibly expelled through the metal injection needle by the action of the plunger of a medical syringe in which the device is positioned, whereupon a free flow of the injectable drug is permitted to pass through the metal injection needle.

These and other meritorious aims and advantages, which will become more fully apparent as the description hereof proceeds, are attained by the novel construction, combination and arrangement of few and simple parts, hereinafter described, and illustrated in the accompanying drawing, forming a material component of the present disclosure, and in which:

FIGURE 1 is an enlarged front elevational view of the principal embodiment of the present invention, partly in section, the needle cover being illustrated as being partly removed from the metal injection needle.

FIGURE 2 is a sectional view of the device, the section being taken on line 2—2 of FIGURE 1.

FIGURE 3 is a sectional view of the device, the section being taken on line 3—3 of FIGURE 1.

FIGURE 4 is an enlarged side elevational view, partly in section, of a modified form of the present invention.

FIGURE 5 is a front elevational view of a drug-containing cartridge, sealed with a device constructed in accordance with the present invention, the cartridge being illustrated as being in an upright position, which is the position most suitable for transportation and storage.

FIGURE 6 is a side elevational view of one form of medical syringe in which a device of the present invention has been entered, ready for use.

Referring in greater detail to the drawing, and more particularly to the principal embodiment of the present invention, which is illustrated in FIGURES 1 through 3, the numeral 10a relates broadly to an assembled embodiment of the present invention. The invention is used as a seal for a conventional medical cartridge 11a, usually made of glass or any other suitable and desirable transparent material. Cartridge 11a is a hollow tube, open at both ends. One end of the said hollow tube 11a is closed by a plug 15 made of rubber or the like resilient material. Cartridge 11a does not form a part of the present invention. The present invention comprises a unitary seal for the other end of cartridge 11a, and a holder for a metal injection needle broadly referred to by the numeral 12a. The unitary seal and needle holder are molded into a single element from plastic or any other suitable and desirable material. Wall 13a of tube 11a has a circumferential recess formed near its open end, as is illustrated in FIGURES 1 and 4 of the drawing. Cartridge 11a is intended to contain any suitable and desirable injectable drug 14a.

The unitary plastic seal and needle holder which constitutes the present invention comprises a hollow sleeve member 18a of an appropriate size, which rests against the circumferential recess near the open end of cartridge 11a and is held in sealing engagement by friction grip. Sleeve member 18a terminates at its normally upper end in a neck portion 19a, the end of which has a reduced portion 20a formed therein. Neck 19a and reduced portion 20a are provided with a central transverse bore 21a therethrough adapted to receive a metal injection needle 23a therein. The metal injection needle 23a is considerably shorter than metal injection needles now commonly in use. The inner end of the said metal injection needle 23a passes through the reduced portion 20a and the neck portion 19a and preferably extends a very short distance into the interior of the hollow sleeve member 18a, as is illustrated in FIGURE 1 of the drawing. The normally front end of the metal injection needle 23a extends outwardly beyond the reduced portion 20a as can also be seen in FIGURE 1 of the drawing. Since the metal injection needle 23a is pre-sterilized, an air-tight cover 24a for the projecting part of the needle 23a is provided. The said cover 24a is preferably made in the shape of a hollow tube, one end of which is open and is engaged at the reduced portion 20a and the other end is closed as at 24a, thereby keeping the metal injection needle 23a sterile. Cover 24a serves a further purpose which will presently become more fully apparent.

Molded from the same material, preferably plastic, from which sleeve member 18a, neck 19a and reduced member 20a are molded and forming an integral part thereof is a funnel 50 positioned inside the hollow sleeve member 18a, the said funnel 50 terminating in a plastic cannula 37a, the plastic cannula 27a having an opening 41 therethrough and being positioned in the injectable drug inside the cartridge 11a and in constant contact therewith. The funnel 50 and the space thereabove constitutes an air chamber 51 for trapped air, as will hereinafter be more fully described. Within neck portion 19a a metal retainer 38 is provided. Retainer 38 comprises preferably a hollow neck portion having a disc-like flange formed therewith. Said flange 38 is provided with a plurality of spaced-apart perforations 39 for a purpose which will presently become apparent. The normally inner end of the said metal injection needle 23a passes into, through and out of the said neck of the said retainer 38 as is illustrated in FIGURE 1 of the drawing. The reason for the provision of the said spool-shaped retainer 38 will also become apparent presently.

The modified form of the present invention, broadly referred to by the numeral 11b, is illustrated in FIGURE 4 of the drawing, comprises a cartridge 13b which contains an injectable drug. Cartridge 13b is identical with cartridge 13a hereabove described in detail.

The modified invention comprises a sleeve member 18b adapted to engage the open end of cartridge 13b and is retained in engagement with the said cartridge 13b by friction grip. Sleeve 18b has a neck portion 19b formed therewith, the said neck portion terminating in a reduced portion 20b. Sleeve 18b, neck portion 19b and reduced portion 20b are preferably molded from plastic to form a unitary device. A bore 21b extends transversely through neck portion 19b and reduced portion 20b. A plastic tubular cannula 40 passes through neck portion 19b, and reduced portion 20b one end of the said plastic cannula 40 extends into the injectable drug in the said cartridge 13b and the other end of the said plastic cannula 40 terminates in the reduced portion 20b as is illustrated in FIGURE 4 of the drawing. Inside reduced portion 20b a spool-shaped metal retainer 42 is provided which serves the same purpose as retainer 38 hereabove described. The said retainer 42 comprises a tubular member having a disc-like flange at each of its ends. The disc-like flanges are each provided with a plurality of spaced-apart perforations. One end of plastic cannula 40 extends into the neck portion of the said metal retainer 42.

Entered into the reduced portion 20b of the device is one end of a metal injection needle 23b which terminates in the said retainer 42 in engagement with one end of the said plastic cannula 40. When the device illustrated in FIGURE 1 or the device illustrated in FIGURE 4 are molded, liquid plastic will enter the perforations in the flanges of the disc-shaped metal retainers 38 or 42, thereby making each retainer an integral part of the device in which it is positioned.

FIGURE 6 shows for the purpose of illustration a medical syringe in connection with which the present invention is used. The syringe, referred to broadly by the numeral 10, comprises a manually operable plunger 30a, adapted to push the rubber plug 15 by which one end of cartridge 13a and 13b respectively is closed into the cartridge 13a and 13b, after such cartridge, here referred to by the numeral 33a has been placed into the cartridge holder in an obvious manner. At 34a, a window is illustrated through which the amount of drug remaining in the cartridge, can be viewed. Neck portion 12a and metal injection needle 23a are shown extending outwardly through an appropriate opening in the normally front end of the syringe 10.

When a device of the present invention is manufactured, a cartridge will be provided, which contains the desired injectable drug in the required amount or dosage. One end of the cartridge is closed by a plug preferably made of a resilient material such as rubber. The open end of the cartridge is then sealed by placing thereon either the seal illustrated in FIGURE 1 or the seal illustrated in FIGURE 4. In either case, the sleeve member of the seal will rest against the circumferential recess near the open end of the cartridge and the seal will be held in engagement with the cartridge by friction grip. When the seal is placed upon the cartridge, the needle holder which forms an integral part of the seal will have been provided with a pre-sterilized needle. The operating end of the metal injection needle 23a or 23b will extend outwardly beyond the plastic needle holder and will be covered with a needle cover 22a or 22b to keep the needle sterile. The normally lower end of the needle cover will make contact with the recess formed by the reduced needle holder and will remain removably secured thereto. When the device illustratd in FIGURE 1 is used, the plastic cannula 37a at the end of the plastic funnel 50 will enter the interior of the cartridge and will be positioned in the injectable drug inside the cartridge. Air will be trapped in the air chamber 51 between the plastic funnel and the beginning of the neck portion of the plastic seal. Because the cannula is inside the drug and the needle cover, which is air-tight is positioned over the needle, the trapped air cannot escape. The plastic cannula must be entered in the drug sufficiently far to prevent the escape of trapped air when the cartridge is tilted or turned. As long as trapped air remains in the device, the drug in the cartridge cannot come in contact with the metal injection needle. The purpose of the metal retainer is to prevent the needle from turning or twisting when it is used. The metal injection needle is thereby also prevented from moving forward or backward while the device is used. The metal injection needle will remain completely rigid.

When the modified form of the invention is used to seal a drug-containing cartridge, it will seal the open end of the cartridge in exactly the same manner as the seal illustrated in FIGURE 1. However, since the modification does not provide a funnel, air will be trapped in the plastic cannula and the metal injection needle, thereby preventing, as long as the air is trapped in the device, the metal injection needle from coming in contact with the drug in the cartridge.

The device is used in the following manner:

When a doctor desires to administer an injectable drug to a patient, he places a device of the present invention in the cartridge holder of his medical syringe in the position illustrated in FIGURE. 1. He will then remove the needle cover in the manner illustrated in FIGURE 1. Thereupon he will press the plunger of his syringe inwardly, thereby pushing the plug 15 into the cartridge. By so doing, he will force the air trapped inside the device, out through the metal injection needle, whereupon the drug in the cartridge will pass freely through the metal injection needle.

Absolute rigidity of the metal injection needle is particularly important to dentists, because the anatomical structure of the human gum is hard, which can cause the needle to be moved unless proper precaution is taken.

When the doctor has administered the drug to his patient, he will discard the entire device. The device including the metal injection needle is disposable and is intended for a single use only. The value of a disposable metal injection needle is that it will prevent the infection of hepatitis disease.

Thus there has been shown and described a device as outlined in the preferred form of its embodiment and in one modification thereof. It is to be understood that the present disclosure is to be regarded as illustrative and descriptive only of the best known forms of the present invention and not as limitative or restrictive to the exact details shown, applicant reserving the right to make such changes and modifications in the structure of his device as might come within the scope of the present claim without thereby departing either from the spirit or the scope of the present invention.

Having thus described the invention, what is claimed as new and desired to secure by Letters Patent, is:

The combination with a tubular, drug-containing cartridge having two open ends, one of the ends closed by a resilient plug entered therein, an external circumferential recess near the other end of the cartridge, and a hollow metal injection needle, adapted to receive the drug and transfer it to a patient; of a seal for the open end of the cartridge and holder for the needle with an air-lock device, said seal and needle holder molded from plastic to form a unitary device, said seal and needle holder comprising a sleeve member, said sleeve member frictionally engaging the cartridge at the circumferential recess, said sleeve member terminating in a constricted element, said constricted element terminating in an external circumferential neck, a recess at said neck, a central transverse opening through said neck and said constricted portion for the passage of one end of the needle therethrough, the other end of the needle extending through and beyond said neck portion, an airtight cover, the second named end of the needle covered therewith, said recess at said neck forming a seat for said cover, a plastic tube in said needle holder one end of said plastic tube extending into the drug in the cartridge, a spool-shaped retainer in said needle holder, an opening in said retainer, said tube retained therein, one end of the needle passing through said needle holder into the opening in said retainer, whereby said tube and said needle are united, a trap for trapped air formed in said plastic tube, and said needle separated from the drug in the cartridge until the cover is removed from the needle for the escape of the air trapped in the tube.

References Cited in the file of this patent

UNITED STATES PATENTS

| | | |
|---|---|---|
| 754,015 | Ryan | Mar. 8, 1904 |
| 2,574,964 | Eisenstark | Nov. 13, 1951 |
| 2,642,868 | Pontius | June 23, 1953 |
| 2,676,591 | Fox | Apr. 27, 1954 |
| 2,680,440 | Fox | June 8, 1954 |

FOREIGN PATENTS

| | | |
|---|---|---|
| 552,685 | Germany | June 14, 1927 |
| 1,108,202 | France | Jan. 10, 1956 |